July 22, 1958 R. C. SMITH 2,844,351
FLUID FLOW CONTROL
Filed Aug. 17, 1953
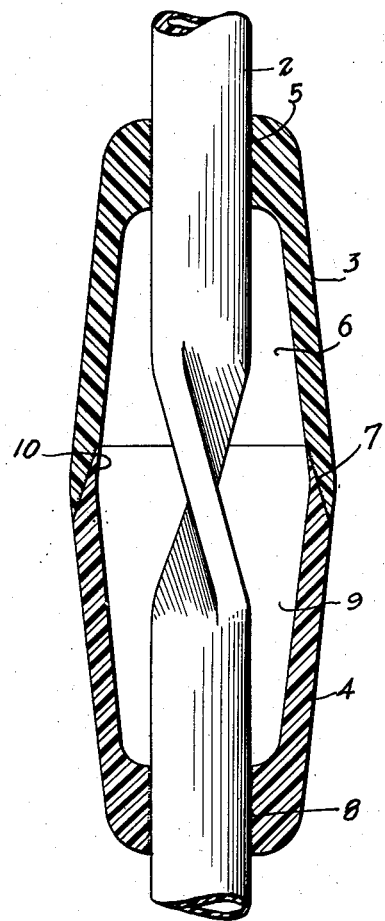
INVENTOR.
RICHARD CHARLES SMITH
BY
ATTORNEYS

United States Patent Office

2,844,351
Patented July 22, 1958

2,844,351

FLUID FLOW CONTROL

Richard Charles Smith, Hollywood, Calif., assignor to Don Baxter, Inc., Glendale, Calif., a corporation of Nevada Application April 17, 1953, Serial No. 349,440

4 Claims. (Cl. 251—4)

This invention relates to a device for controlling the flow of fluid through a flexible tube.

In the administration of parenteral solutions the control of the rate of flow is important. The means employed for controlling the flow rate must be capable of maintaining an adjusted position so that the flow rate will not change materially if the administration apparatus is left unattended. Moreover, the fluid flow control must not be susceptible to a change in adjustment by inadvertent pull of the patient on the administration set.

It is further desirable that the control device should be easily adjusted with one hand so as to be convenient for a busy anesthetist or nurse.

A further requirement is that change in adjustment of the flow rate should not result in any tension on the administration set, that is to say, the change in the flow rate should not have the effect of causing a movement of the needle in the vein such as would cause either pain or discomfort to the patient, or even yank the needle from its position.

A further requirement of a device for controlling the fluid flow during administration of parenteral solution is that the device must be sufficiently inexpensive as to be expendable. Most administration sets now in use for parenteral solutions are expendable and accordingly any flow device incorporated therein must be sufficiently economical as to likewise be expendable.

Previous to the present invention various types of flow control devices have been devised but they generally are either too expensive for use in expendable sets, are inconvenient for one hand operation, or designed so they may slip permitting a dangerous increase in flow rate, or so defective in construction as to be dangerous to be used in administration sets unless carefully attended.

The general object of the present invention is to provide a device for controlling fluid flow which is sufficiently inexpensive as to be useful in an expendable administration set while at the same time presenting an adjustment device which may be adjusted with one hand and which will retain its adjusted position without danger, even in an unattended set.

The flow control of the present invention operates to control the fluid flow through tubing by twisting the tubing rather than pinching it. It consists essentially of two hollow members mounted around the tubing. Each member has one end secured to the tubing. The members meet on a friction or other bearing surface which has the effect of maintaining the members in substantially the same actual spacing and for frictionally retaining the two members in a relatively rotated position. By rotating one member relative to the other the portion of tubing between the members is twisted. The twisting of the tubing stretches the tubing between the members and controls the flow area of the tubing. Furthermore, the tension on the tubing created by the twisting acts to increase the friction on the contact members of the control device so as to facilitate retaining the same in an adjusted position.

In practice one of the two members which form the control device of the present invention may be formed upon or made an integral part of some other portion of an administration set, such as a drip housing.

The fluid control device of the present invention will be more fully understood from the following description of a preferred form or example of a device embodying the invention and for that purpose I hereafter describe a preferred example of the invention, the description being given in connection with the accompanying drawing, in which is shown an elevation mainly in vertical section.

Referring to the drawings, 2 indicates a flexible tubing which is generally part of an administration set for administering parenteral solutions. The fluid device of the present invention is shown as comprising two members 3 and 4, a section of at least one of which is longitudinally resilient. The member 3 is indicated as having a bore 5 at one end substantially equal to that of the tubing 2 and at the bore 5 the member 3 is attached to the tubing 2 by suitable means, such as friction, cement, etc. Beyond the bore 5 the member 3 has an enlarged axial recess 6 and the member 3 is generally indicated as preferably substantially bell-shaped with the smaller end attached to the tubing. The larger end of the member 3 is preferably provided with a contact or bearing face 7 indicated as preferably beveled with respect to the end of the member. The member 4 is likewise indicated as substantially bell-shaped having at its reduced end a bore 8 attached to the tubing by friction cement or other means, and having an enlarged bore 9. This member 4 is preferably provided at its large end with beveled contact faces 10 for fitting and contacting the bevel contact face 7 of the member 3.

The meeting contact faces 7 and 10 of the two members 3 and 4 are intended to operate as friction surfaces for retaining the two members in any adjusted rotary position with respect to each other. For this purpose such faces may be knurled, notched or provided with other means for increasing the friction where necessary depending on the materials of construction of the members 3 and 4.

In operation of the fluid control device of the present invention it will be seen that the members 3 and 4 have a fixed length of the tubing 2 held by the same. As one member is given a rotation relative to the other this section of tubing is twisted thereby creating a tension flattening the tubing, as indicated in the figure, so as to decrease the rate of flow therethrough, the degree of flattening the tubing and the pressure maintaining the tubing relatively closed increasing with the degree of twist. Likewise, the twist on the tubing creates a tension on the tubing increasing the pressure between the contact surfaces 7 and 10 thereby facilitating retaining the members 3 and 4 in any adjusted position.

With the fluid control device of the present invention it is found that the control of the fluid rate is accurate and sensitive. Movement of the tubing or pull on the tubing has no effect upon changing the setting of the fluid control device. A single hand may easily be employed in effecting an adjustment of the fluid control device. No change in the adjustment of the device has any tendency to pull upon the administration needle. The device is not only inexpensive and easy to manufacture and assemble but it can be used innumerable times without weakening or causing the tubing to fail.

While the particular form of the fluid control device herein described is well adapted to carry out the objects of the present invention it is to be understood that various changes and modifications may be made and this invention is of the scope set forth in the appended claims.

I claim:

1. In a fluid control device, including a flexible tubing, two control members each mounted for relative rotation about the longitudinal axis of the flexible tubing and each fixed to the tubing for twisting said tubing about said axis for closing the passage therethrough, the tubing extending through and beyond said members, said members having contact faces, means allowing the points at which the members are fixed to the tubing to move inwardly against a longitudinal outward force when the tubing is twisted.

2. The structure of claim 1 in which said means is a longitudinally resilient section in at least one of the control members.

3. The structure of claim 1 in which said means comprises matching beveled contact faces on said control members arranged so that one of said faces telescopes within the other face when the tubing is twisted, and distortion of the members provides the longitudinal outward force.

4. The structure of claim 1 in which said means is a hollow area in said control members around said tubing, said hollow area having a larger diameter at the center than at the point of attachment to the tubing so that longitudinal tension on the control members forces the walls of said members adjacent said center to bend outwardly.

References Cited in the file of this patent

UNITED STATES PATENTS

| | | |
|---|---|---|
| 1,986,484 | Schlueter | Jan. 1, 1935 |
| 2,416,391 | Hixson | Feb. 25, 1947 |
| 2,657,004 | Lovington | Oct. 27, 1953 |
| 2,706,101 | Cantor | Apr. 12, 1955 |

FOREIGN PATENTS

| | | |
|---|---|---|
| 16,321 | Great Britain | Aug. 1, 1908 |
| 535,489 | Great Britain | of 1941 |
| 634,975 | Gretat Britain | of 1950 |